United States Patent [19]
Nix

[11] 3,790,143
[45] Feb. 5, 1974

[54] REMOVAL OF FLUORIDES FROM GASES
[75] Inventor: Thomas B. Nix, Baton Rouge, La.
[73] Assignee: Fuller Company, Catasauqua, Pa.
[22] Filed: July 31, 1972
[21] Appl. No.: 276,492

[52] U.S. Cl............................ 266/16, 55/71, 55/345, 75/68 R
[51] Int. Cl............................................ C22b 21/06
[58] Field of Search .......... 75/68 R; 266/15, 16, 19; 55/71, 77, 345, 474

[56] References Cited
UNITED STATES PATENTS
3,503,184  3/1970  Knapp et al. ........................... 55/71

*Primary Examiner* — Gerald A. Dost
*Attorney, Agent, or Firm* — Frank H. Thomson

[57] ABSTRACT

A method and apparatus for removing gaseous fluorides from gases evolved from an aluminum smelting furnace. Basically, the fluorides are removed by achieving intimate contact between finely divided particles of alumina and the fluoride-containing gases. This is achieved by feeding the particles of alumina into a stream of gases collected from the aluminum smelting furnaces countercurrent to the flow of gases. The particles of alumina adsorb the fluorides. The particles of alumina and adsorbed fluorides are then separated in a gas-solids separator, such as a cyclone and the alumina may then be fed to the smelting furnaces. Preferably, two stages are used. The gases supplied to the second or last cyclone in the direction of gas flow are supplied with new alumina countercurrent to the flow of gases. The alumina particles removed in this second cyclone are conveyed to the gas stream supplied to the first cyclone in the direction of gas flow. In a two-stage apparatus, these gases will be those evolved from the smelting furnace. The alumina separated from the first cyclone may be either conveyed to the smelting furnace or recirculated or a portion may be recirculated and a portion conveyed to the smelting furnace. The gases separated in the first cyclone are conveyed to the second cyclone.

4 Claims, 1 Drawing Figure

PATENTED FEB 5 1974 3,790,143
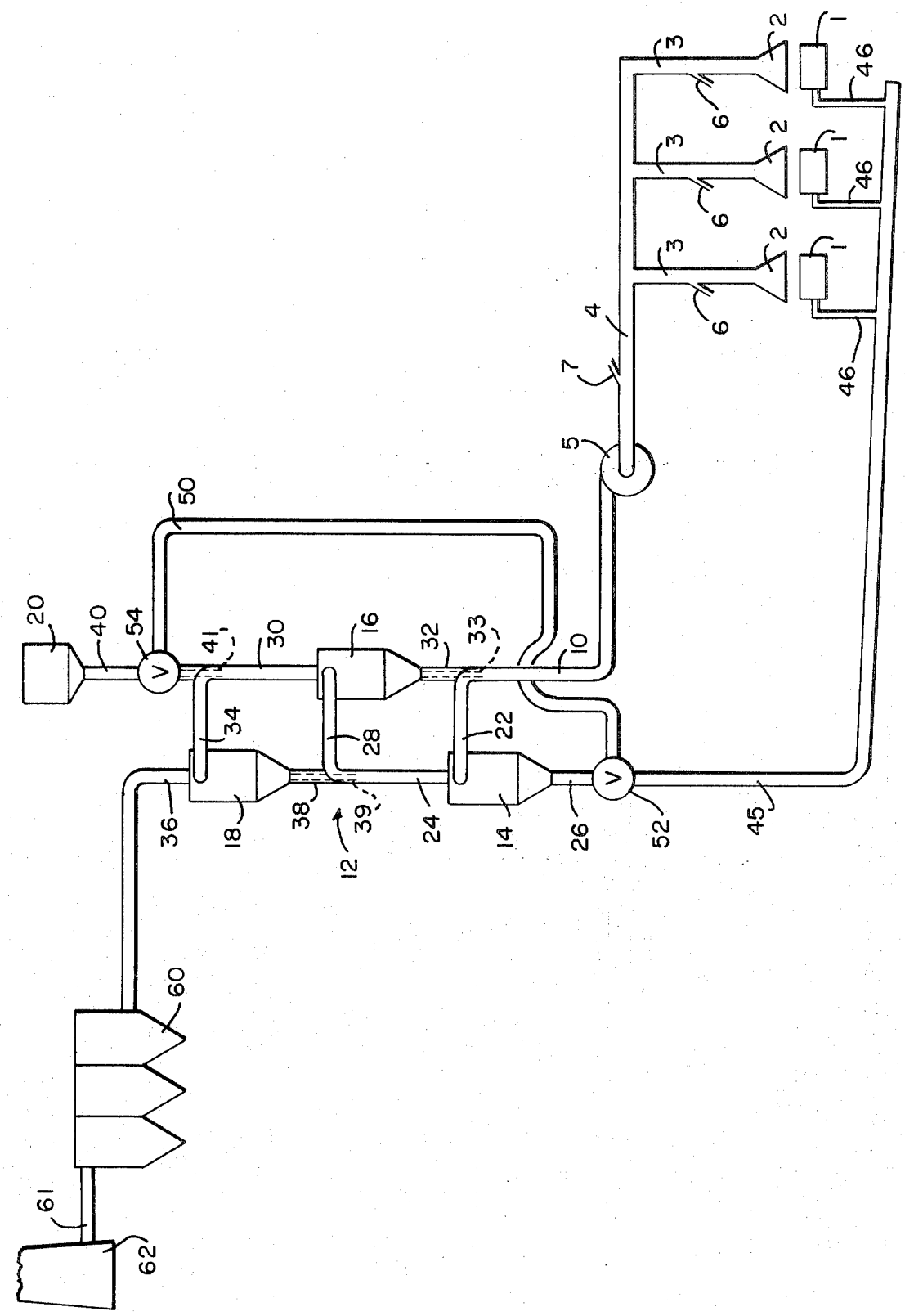

REMOVAL OF FLUORIDES FROM GASES

BACKGROUND OF THE INVENTION

This invention relates to a method and apparatus for removing fluorides from gases and in particular to a method and apparatus for removing gaseous fluorides from gases evolved from aluminum smelting furnaces by the use of finely divided particles of alumina to adsorb the fluorides.

The removal of the fluorides from the gases adsorbed from the smelting furnace is important for two basic reasons. First, the fluorides are a dangerous pollutant which must be removed from the gases in order to conform with pollution control laws and provide a safe operation. A second reason for removing the fluorides from the gases is that the fluorides are used in aluminum smelting operations. These fluorides have become expensive and their recapture from the exhaust gases is an economical saving to the aluminum smelter.

Prior to the present invention, it was known that fluorides could be removed from gases evolved from aluminum smelting furnaces by achieving intimate contact between the flouride-containing gases and finely divided particles of alumina. The particles of alumina adsorb the fluorides.

Because of the economics of saving the fluorides evolved from the aluminum smelting furnace and the fact that the fluorides are used in the smelting operation, after the fluorides are adsorbed on the particles of alumina, the alumina can be fed directly into the smelting furnace. It should be obvious, therefore, that the use of alumina to remove the fluorides in the off gases of the smelting operation is a practical, economical pollution control technique.

One prior method of removing the fluorides from the off gases of an aluminum smelting furnace is shown in U. S. Pat. No. 2,919,174. In method disclosed in this patent, calcium carbonate is fed into the stream of gases which are evolved from the smelting furnace and separated from the gases by means of a fabric filtering device, such as a baghouse. The fabric filters are coated with the calcium carbonate and as the fluoride-rich gases pass through the fabric filter, intimate contact is achieved between the gases and the coating, and the fluorides are adsorbed by the calcium carbonate. The patentee also states that alumina can be used in place of the calcium carbonate. The method of this patent has the disadvantage that the gases from the smelting furnace must be reduced in temperature before it enters the filter in order to avoid a fire in the baghouse.

U. S. Pat. No. 3,503,184 shows another method of removing gaseous fluorides wherein a shallow fluid bed of alumina is used for achieving intimate contact between the alumina and the fluoride-rich gases. After the fluoride-rich gases pass through the shallow fluid bed, the alumina and other particulates are removed from the gases by means of a fabric filter. The method and apparatus shown in this patent are believed to work well with certain smelting operations. However, the pressure drop across the fluid bed, the alumina and other particulates are removed from the gases by means of a fabric filter. The method and apparatus shown in this patent are believed to work well with certain smelting operations. However, the pressure drop across the fluid bed can be greater than desirable. Because of the large volume of gases evolved from the smelting operation, this higher than desired pressure drop can become expensive because of the large number of fans or blowers required to elevate the evolved gases to the required pressure. Another disadvantage of the fluid bed approach disclosed in U. S. Pat. No. 3,503,184 is that with certain smelting operations, such as the Soderberg process, tars are evolved with the gases. These tars can tend to foul the fluid bed and the baghouse filter accompanying the fluid bed. As in the case of U. S. Pat. No. 2,919,174, the temperature of the evolved gases must be substantially reduced in temperature in order to prevent destruction of the baghouse.

By the present invention, I have provided a novel method and apparatus for dry scrubbing the gases evolved from aluminum smelting furnaces. The method and apparatus of the present invention uses a plurality of serially connected gas-solids separators for achieving intimate contact between a gas and solid particulate material. It relies on the addition of particulate alumina to the stream of gases evolved from the aluminum smelting furnace and the use of a cyclone separator to achieve intimate contact between the alumina and the gases and at the same time separate the alumina and adsorbed fluorides from the gases. The method and apparatus of the present invention permits the recirculation of the alumina and the selection of whether the alumina is to be recirculated to adsorb additional fluorides or conveyed directly to the aluminum smelting pots.

The method and apparatus of the present invention have the additional advantage that cooling of the evolved gases is not as critical as prior methods and apparatus for removing gaseous fluorides. This feature is advantageous in that the hot gases evolved from the smelting furnace are usually cooled by adding ambient air to the evolved gases. This greatly increases the volume of gases which must be passed through the system. This increases the fan requirements of the system. As dilution is decreased, the amount of gases passing through the system and the fan requirements of the system are reduced. Also, by being able to handle higher temperature gases, the system of the present invention can be used for preheating the alumina which is supplied to the smelting furnace.

SUMMARY

It is, therefore, the principal object of this invention to provide a novel method and apparatus for removing fluorides from gases evolved from aluminum smelting furnaces by achieving intimate contact between particles of alumina and the evolved gases.

It is an additional object of this invention to provide a method of removing fluorides from gases by the addition of alumina to the gases, which method can be used for all types of aluminum smelting operations.

It is a still further object of this invention to provide a method of removing fluorides from gases which is capable of operating at smaller pressures than prior methods.

It is still another object of this invention to provide a method and apparatus for removing gaseous fluorides from a gas stream which is capable of working with high temperature gases.

In general, the foregoing and other objects will be carried out by providing the method of removing gaseous fluorides from the gases evolved from an aluminum smelting furnace comprising the steps of passing finely divided particles of alumina serially through a plurality of gas-solids separators, bringing the alumina in the gas-solids separators into direct, intimate contact with the gases evolved from the aluminum smelting furnace while the evolved gases are passing countercurrent to the general direction of flow of the alumina whereby the gaseous fluorides in the evolved gases are adsorbed by the alumina; separating the alumina from the evolved gases in the several gas-solids separators; and introducing into the aluminum smelting furnace at least a portion of the alumina separated from the evolved gases in the first in the series of gas-solids separators in the direction of gas flow.

BRIEF DESCRIPTION OF THE DRAWING

The invention will be described in connection with the annexed drawing wherein the single FIGURE represents a diagrammatic view of the apparatus of the present invention.

DESCRIPTION OF THE PREFERRED EMBODIMENT

In the single FIGURE of the drawing, aluminum smelting furnaces are generally indicated at 1. In the drawing, three such pots are shown. A gas collecting hood 2 is positioned over each smelting furnace 1 to collect gases evolved from the furnace. A duct 3 connects each hood 2 to a main duct 4 and fan 5. In the past, before it was known to use alumina to remove the fluorides from the evolved gases, the fan 5 would be connected directly to a high stack to exhaust the evolved gases. In order to reduce the temperature of these evolved gases and to reduce the concentration of fluorides per volume of air conveyed to the fluoride removal apparatus, each duct 3 may be provided with an ambient air inlet 6 for diluting the evolved gases. In addition, the main duct 4 may be provided with an ambient air inlet 7 for further diluting the evolved gases. The dilution air inlets 6 and 7 are considered to be optional with the present invention since it is believed that the fluoride removal system of the present invention is capable of operating with much higher temperature gases than prior systems. If desired, some of the dilution inlets may be used and others closed.

With the present invention, the evolved gases are conducted by the fan 5 through a conduit 10 to a fluoride removal system generally indicated at 12. This system includes a plurality of serially connected gas-solids separators, such as cyclones 14, 16 and 18. The fluoride removal system shown in the drawing includes three gas-solids separators, but the invention is not limited to the use of three. There may be two separators or four or more, but it is believed that at least two are required, but a single separator is considered to be within the scope of the invention.

A source 20 of finely divided particles of alumina is flow connected to the fluoride removal system 12 at the top thereof. The overall direction of alumina flow through the system is countercurrent to the direction of gas flow through the system. For descriptive purposes, the fluoride removal system will be described in the direction of gas flow with the cyclone 14 considered the first gas-solids separator and the cyclone 18 considered the last gas-solids separator.

Each gas-solids separator 14, 16 and 18 includes a gas-solids inlet conduit, an outlet conduit for gases and an outlet conduit for separated solids. The cyclone 14 has a gas-solids inlet 22, a gas outlet conduit 24 and a solids outlet conduit 26. The cyclone 16 has a gas-solids inlet conduit 28, a gas outlet conduit 30 and a solids outlet conduit 32 connected thereto. The cyclone 18 includes a gas-solids inlet conduit 34, a gas outlet conduit 36 and a solids outlet conduit 38. The alumina supply hopper 20 includes a valved discharge conduit 40. The serial connection of the gas-solids separators 14, 16 and 18 is such that the evolved gas conduit 10 is flow connected to the gas-solids inlet 22 of the cyclone 14; the gas outlet 24 of the cyclone 14 is flow connected to the gas-solids inlet 28 of the cyclone 16; and the gas outlet conduit 30 of the cyclone 16 is flow connected to the gas-solids inlet 34 of the cyclone 18. The solids outlet 38 of cyclone 18 includes a portion 39 extending into gas conduit 24 of cyclone 14 to flow connect conduits 38 and 24; solids outlet conduit 32 of cyclone 16 has a portion 33 extending into gas conduit 10 to flow connect conduits 32 and 10; and the conduit 40 has a portion 41 extending into gas outlet 30 of cyclone 16 to flow connect conduits 40 and 30.

The method of the present invention will be understood if a single cyclone is first considered. For this purpose, the cyclone 14 will be considered. The gases evolved from the smelting furnaces are supplied through the conduit 10. Finely divided particles of alumina are supplied to the conduit 10 countercurrent to the flow of gases by the conduit 32. The particles of alumina are entrained by the fluoride-rich gases and conducted by the gas-solids inlet 22 to the cyclone 14. During this entrainment and while in the cyclone 14, intimate contact is achieved between the particles of alumina and the fluoride-rich gases. During this intimate contact, the particles of alumina adsorb at least some of the gaseous fluorides contained in the evolved gases. In the cyclone 14, the particles of alumina and adsorbed fluorides are separated from the evolved gases. The gases are then discharged from the cyclone 14 through conduit 24. In a single stage system, these gases would then be conducted directly to a high efficiency gas-solids separator, such as a baghouse 60, and stack 62. The solids are discharged through the conduit 26. From conduit 26, the alumina can be conveyed by conduits 45 and 46 to the smelting furnaces 1 or recirculated through conduit 50.

In order to achieve better separation of the fluorides from the evolved gases, I have chosen to use a multiple stage system wherein there are a plurality of serially connected cyclones. When the multi-stage system is used, alumina is supplied through conduit 40 to gas conduit 30. The rising gases containing gaseous fluorides entrain the particles of alumina. The gas and entrained alumina are conveyed through gas-solids inlet 34 to cyclone 18. In conduit 34 and cyclone 18, intimate contact between the gases and alumina is achieved and the fluorides are adsorbed by the alumina. high efficiency gas-solids separator 60, such as a baghouse, and then to a conduit 61 and stack 62.

The particles of alumina discharged from cyclone 18 through conduit 38, 39 are conveyed to conduit 24. In conduit 24, the fluoride-containing gases discharged from cyclone 14 entrain the alumina from conduit 26 and convey it through gas-solids inlet 28 of cyclone 16.

During this entrainment, intimate contact is achieved between the gases and the particles of alumina and adsorption of the fluorides occurs. In the cyclone 16, the solids are separated and the gases are conveyed towards the cyclone 18 through conduit 30 where they entrain the alumina from conduit 40. The separated particles of alumina are conveyed through conduit 32 to the conduit 10 to be entrained by the raw evolved gases and conveyed through conduit 22 to cyclone 14. As in the case of a single cyclone, in cyclone 14, the alumina is separated and discharged through conduit 26. Gases are discharged through conduit 24 where they entrain solids from conduit 38 of cyclone 18 and convey the solids to cyclone 16 through conduit 28.

Thus, it can be seen that as the evolved gases move upwardly through the fluoride removal system 12, some of the fluorides will be removed in the first stage or cyclone 14. Those fluorides which pass through the first stage without contacting and being adsorbed by alumina will be removed in the later stages or cyclones 16 and 18.

Alumina is capable of adsorbing a large amount of fluoride. Therefore, the amount of alumina actually needed to adsorb the fluorides evolved from the smelting furnaces is small compared to the volume of gases evolved. This is particularly true when the evolved gases are diluted with ambient air to reduce their temperature. Therefore, in order to insure intimate contact between the alumina and evolved gases, it is necessary to use more alumina than is actually required to adsorb the fluorides. In view of this, it is possible to recirculate the alumina used in the system of the present invention.

For recirculation purposes, I have provided a conduit 50 selectively connecting the conduits 26 and 40 and a pair of valves 52 and 54. The valve 52 controls whether the alumina discharged from cyclone 14 through conduit 26 will be conveyed through conduits 45 and 46 to the furnaces 1 or through conduit 50 for recirculation. The valve 52 can also proportion the alumina so that some is conveyed to the furnaces 1 and some is recirculated through conduit 50. The valve 54 controls the amount of new alumina supplied to the system from hopper 20 and the amount of recirculated alumina supplied to conduit 40 from conduit 50. Suitable controls (not shown) may be provided for coordinating valves 52 and 54. Thus, the present invention has the advantage that the adsorption capabilities are completely utilized. This is achieved by the recirculation system.

The method and apparatus of the present invention can be used with the various types of smelting operations. Tars which may be evolved with the gases are not believed to interfere with the apparatus.

The present invention has the further advantage that the heat present in the gases evolved from the smelting furnaces can be used to preheat the alumina fed to the smelting furnaces 1. Once in the smelting furnaces, the alumina must be heated to a high temperature in order to make aluminum. This heat is discharged in the evolved gases. The use of this heat in the evolved gases to preheat the alumina conveyed to the smelting furnaces can result in substantial savings to the separator of the furnaces. Therefore, it can be seen with the apparatus and method of the present invention the alumina can be used to remove fluorides from the evolved gases to thereby save these fluorides and reduce the cost of separating the smelting plant, and the heat from the off gases can be used to preheat the alumina to further reduce the cost of operating the smelting plant. Prior methods of removing fluorides were not able to take advantage of this preheating.

Although the apparatus has been illustrated with the fan 5 shown between the furnaces 1 and the cleaning system 12, a fan can be located between the stack 62 and baghouse 60. In this way the entire system is under a negative pressure.

It should be obvious from the foregoing that the objects of this invention have been carried out. A novel method and apparatus has been provided for economically removing the fluorides from the gases evolved from an aluminum smelting furnace. A novel dry scrubber has been provided which can reduce a pollution problem and reduce the cost of operating a smelting plant.

It is intended that the foregoing description be merely that of a preferred embodiment and that the invention be limited solely by that which is within the scope of the appended claims.

I claim:

1. Apparatus for removing gaseous fluorides from gases evolved from an aluminum smelting furnace comprising:

means for collecting the gases evolved from an aluminum smelting furnace;

a gas-solids separator;

means for conducting the collected gases to the gas-solids separator;

means for supplying finely divided particles of alumina to said means for conducting the collected gases whereby the alumina is entrained in said collected gases, intimate contact is achieved between the collected gases and the alumina and the fluorides are adsorbed by the alumina;

means for discharging alumina from the gas-solids separator and selectively conducting at least a portion of the separated alumina to an aluminum smelting furnace.

2. Apparatus according to claim 1 further comprising a second gas-solids separator; means for conducting gases discharged from said gas-solids separator to said second gas-solids separator; means for supplying finely divided particles of alumina to said means for conducting discharged gases to said second gas-solids separator whereby the alumina is entrained in said discharged gases and conducted to said second gas-solids separator; means for conducting particles of alumina discharged from the second gas-solids separator to said means for supplying finely divided particles of alumina to said gas-solids separator.

3. Apparatus according to claim 2 further comprising means for selectively conducting at least a portion of the particles of alumina separated from the gas-solids separator to the means for supplying particles of alumina to said means for conducting discharged gases.

4. Apparatus according to claim 3 wherein said gas-solids separator and said second gas-solids separator are each a cyclone.

* * * * *